United States Patent [19]

Elias

[11] 4,154,883
[45] May 15, 1979

[54] EMBOSS LAMINATED FIBROUS MATERIAL

[75] Inventor: Robert T. Elias, Downers Gove, Ill.

[73] Assignee: Johnson & Johnson, New Brunswick, N.J.

[21] Appl. No.: 734,207

[22] Filed: Oct. 20, 1976

[51] Int. Cl.$^2$ ............................ B32B 5/14; B32B 5/26
[52] U.S. Cl. ..................................... 428/171; 156/221;
156/306; 162/129; 162/130; 162/146; 162/148;
162/149; 428/172; 428/218; 428/296; 428/302;
428/305
[58] Field of Search ............... 428/171, 198, 218, 296,
428/302, 172, 301, 305; 156/221, 306, 62.2;
162/148, 149, 146, 117, 125, 129, 130

[56] References Cited

U.S. PATENT DOCUMENTS

| | | | |
|---|---|---|---|
| 3,444,859 | 5/1969 | Kalwaites | 428/171 |
| 3,542,634 | 11/1970 | Such et al. | 428/289 |
| 3,856,612 | 12/1974 | McGinnis, Jr. | 428/296 |
| 3,952,124 | 4/1976 | Mesek | 428/218 |
| 3,993,820 | 11/1976 | Repke | 428/171 |
| 4,012,281 | 3/1977 | Mayer et al. | 428/198 |

Primary Examiner—George F. Lesmes
Assistant Examiner—P. Thibodeau

[57] ABSTRACT

A multi-ply fibrous material is provided which is suitable for use as a wipe, swab, or sponge and which comprises a backing layer and at least one liquid absorbent layer. The backing layer is made of compactly assembled natural wood pulp fibers, bonded to each other with an adhesive binder to provide wet strength. The liquid absorbent layer is made of loosely assembled fibers including both natural wood pulp fibers and wettable thermoplastic synthetic wood pulp fibers which are irregularly arranged, intersecting, overlapping, and mechanically interengaged segments of the thermoplastic synthetic wood pulp fibers being heat fused and bonded to the backing layer in a discontinuous pattern of embossed areas alternating with unembossed areas.

The aforementioned fibrous material is made by bringing together the aforementioned backing layer and at least one liquid absorbent layer, applying heat and pressure to the layers in a discontinuous embossing pattern and applying heat in the absence of pressure to the layers to heat fuse and bond thermoplastic synthetic wood pulp fibers to each other and to other fibers in the absorbent layer.

10 Claims, 5 Drawing Figures

EMBOSS LAMINATED FIBROUS MATERIAL

This application relates to a multi-ply fibrous material suitable for use as a wipe, swab, or other similar cleaning device, and in particular such a device having a backing layer that retains strength while wet and a liquid absorbent layer attached thereto that contains synthetic wood pulp fibers as one constituent thereof, and to a method of producing the same.

BACKGROUND OF THE INVENTION

Synthetic polymeric fibers that have physical and morphological characteristics generally similar to pulp fibers produced from natural woods have been known for approximately 10 years. Examples of such fibers are the synthetic wood pulp fibers formed of polyethylene that are sold by Crown Zellerbach under the trademark SWP.

Various methods of making synthetic wood pulp fibers are known, including (1) solution polymerization accompanied by stirring, (2) dissolving a preformed polymer and subjecting the solution to an anti-solvent, or (3) forming the polymer at the interface between liquid layers, with localized stirring provided to pull the polymers thus formed into fibrillated forms. Examples of methods of producing synthetic wood pulp fibers are disclosed in U.S. Pat. Nos. 3,560,318; 3,081,519; 3,003,912; 3,068,527; and 3,290,207; South African Pat. No. 697,432; United Kingdom 1,102,342; and Netherlands Patent Application A132/48-7313178.

As used in this specification and the appended claims, the term "synthetic wood pulp fibers" means synthetic, water dispersible, thermoplastic, elongated, supple, randomly bent, polymeric fibers or fibrils generally similar in size and shape to conventional wood pulp fibers produced from naturally occurring woods. Each such "synthetic wood pulp fiber" is of irregular cross sectional shape measured at any given point along its length, and in addition is nonuniform in cross section along its length. The predominant shape of the fibers is usually rather ribbon-like.

The present invention utilizes synthetic wood pulp fibers in a high loft, low density, nonwoven fibrous material, such as an air-laid web, which is one component of a wipe, swab, or other similar cleaning device. Cleaning devices of this type should possess two characteristics, both of which are important but which are mutually inconsistent First, the device must have a substantial amount of wet strength in order to hold the desired shape and avoid disintegration of the fibrous material when in use. This characteristic is best provided by a compactly assembled aggregation of fibers bonded with an adhesive binder. Second, the cleaning device must have a high degree of liquid absorbency, as well as a substantial amount of resiliency in its structure in order to be most efficient in adapting to corners to be cleaned. This characteristic is best provided by a high loft, low density, nonwoven fibrous material in which the fibers are loosely assembled.

The two contradictory objectives just described can be achieved by joining nonwoven webs of different types to form the desired cleaning device. Thus, a wet-laid nonwoven web of compactly assembled fibers bonded with a water insoluble adhesive binder can be used to provide the necessary wet strength. An air-laid nonwoven web of loosely assembled fibers can be used to provide the high loft, low density, liquid absorbent layer.

Use of such different fibrous layers to form the two-ply cleaning device of this invention presents difficulties in causing the two layers to adhere to each other without destroying the liquid absorbent character of the second layer. These difficulties are suprisingly avoided by the present invention.

SUMMARY OF THE INVENTION

The product of this invention in one embodiment is a wipe, swab, sponge or other cleaning device which includes a backing layer and a liquid absorbent layer attached thereto. The backing layer is formed of irregularly arranged, intersecting, overlapping, mechanically interengaged, compactly assembled natural wood pulp fibers bonded to each other with an adhesive binder to provide wet strength. The liquid absorbent layer is formed of similarly disposed fibers except that they are loosely assembled with a multiplicity of interstices between them and are not necessarily bonded to each other by means of an adhesive binder.

The weight of the backing layer before it is joined to the liquid absorbent layer may be, for example, from about 50 grains/sq. yd. to about 900 grains/sq. yd. The weight per square yard of the liquid absorbent web before it is joined to the other web may be from about 100 grains/sq. yd. to about 2500 grains/sq. yd.

The fibers of the liquid absorbent layer include both liquid absorbent natural wood pulp fibers and wettable synthetic wood pulp fibers. The synthetic wood pulp fibers have a melting point lower than the other fibers of the two-ply fibrous material, preferably by at least about 10° to 20° C..

The two layers are emboss laminated together, with segments of some of the synthetic wood pulp fibers of the second layer being heat fused and bonded to the backing layer in a discontinuous pattern of embossed areas, to provide a reliable bond between the two layers.

The embossed areas alternate with unembossed areas across the backing layer. The synthetic wood pulp fibers located in the unembossed areas are heat fused and bonded to each other and to other fibers in the second fibrous layer, to provide a three-dimensional network of stabilized absorbent cellulose fibers which is not subject to collapsing when wet, and which has good liquid holding capacity, in those unembossed portions of the second layer.

The bonded fibrous backing layer of the product of this invention is similar to wet strength tissues sold commercially as disposable cleansing and wiping tissues. Such bonded fibrous tissues are not ordinarily capable of being laminated with other fibrous materials without the use of adhesive binder, or the full-area lamination with synthetic wood pulp fibers disclosed in the section headed "Applications — Nonwovens and Laminates" in the September 1974 publication by Crown Zellerbach entitled SWP. Suprisingly, the presence of the synthetic wood pulp fibers in the second, liquid absorbent layer of the product of this invention produces a reliable bond between the two layers without any such adhesive binder, and with only discontinuous emboss bonding as described. Another surprising result is the fact that the double bonding actions of the emboss lamination and the generalized heating of the synthetic wood pulp fibers of the unembossed areas appear to operate independently of each other, to render the unembossed areas a three dimensional fibrous network of stabilized absorbent cellulose fibers having good liquid holding capacity.

A preferred embodiment of the cleaning device of this invention, in which the liquid absorbent fibrous layer has additional structural integrity, includes synthetic wood pulp fibers in that layer arranged in overlapping contact engagement with other synthetic wood pulp fibers in the layer to trace a multiplicity of continuous bonded fiber paths extending from one edge of the liquid absorbent layer to the opposite edge in a generally transverse direction across the material. In addition, the liquid absorbent layer also contains a multiplicity of continuous bonded fiber paths extending from another edge of the material to the edge opposite thereto in a direction generally normal to the first direction mentioned.

In one form of the invention, the two-ply fibrous material constructed according to the invention is cut to the shape and size of a cleaning device. Synthetic wood pulp fibers located in the edge portions of the liquid absorbent layer of the device are heat fused and bonded to other synthetic wood pulp fibers and to other types of fibers in the two layers. The result of this construction is to prevent fiber loss and retain the product integrity of the device.

In another embodiment, the cleaning device may comprise a three-ply material with a backing sheet sandwiched between two liquid absorbent layers, each of which contains wettable thermoplastic synthetic wood pulp fibers, as described above.

In the method of this invention, the two or three fibrous layers containing fibers as described are first brought together, then heat and pressure are applied to the layers in a discontinuous embossing pattern across the layers, to reliably bond synthetic wood pulp fibers of the liquid absorbent layer to the backing layer. Thereafter, heat is applied to the remainder of the multilayer composite in the absence of pressure to heat fuse and bond synthetic wood pulp fibers contained in the liquid absorbent layer or layers to each other and to other fibers in that layer, to complete the cleaning device.

In a preferred embodiment, heat and pressure are applied to the edge portions of the cleaning device to render edge portions of the liquid absorbent layer compacted, and heat fused and bonded to synthetic wood pulp and other fibers of the two layers.

bRIEF DESCRIPTION OF THE DRAWING

The invention will now be described with reference to the accompanying drawing, in which.

DETAILED DESCRIPTION OF THIS INVENTION

Starting Materials

Figure 1:
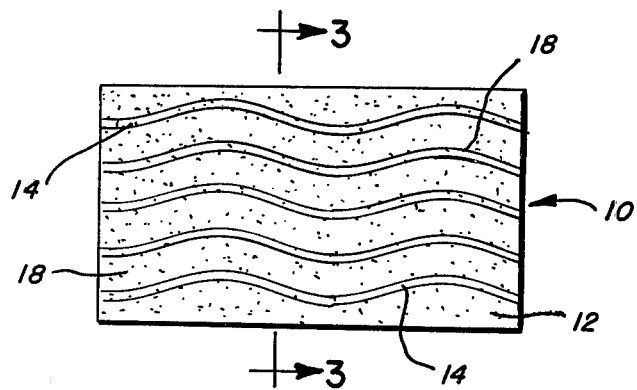
FIG. 1 is a top plan view of a cleaning device constructed in accordance with this invention.
Figure 3:
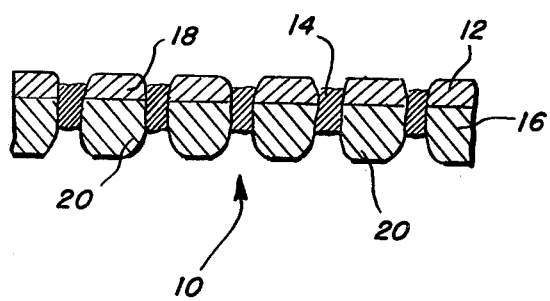
FIG. 3 is an enlarged cross sectional view taken generally along the line 3—3 in FIG. 1.

FIG. 1 is a top plan view of a cleaning device 10 constructed according to this invention. Backing layer 12 is attached at wavy embossed lines 14 to a second, liquid absorbent layer that is seen in enlarged diagrammatic plan view in FIG. 2 and in enlarged diagrammatic cross section in FIG. 3.

Backing layer 12 is comprised of irregularly arranged, intersecting, overlapping, mechanically interengaged, compactly assembled natural wood pulp fibers such as a wet-laid nonwoven web. The term "mechanically interengaged" is used in this specification and claims to refer to fibers (usually randomly bent) that are interlocked or interentangled with other fibers to provide a degree of structural integrity whether or not binder is present in the layer of fibers. The fibers of backing layer 12 are bonded to each other with adhesive binder to provide wet strength, the binder preferably being a hydrophilic binder with no surfactant. Backing layer 12 is similar in construction to fibrous webs sold commerically for use as disposable cleansing and wiping tissues.

Figure 2:
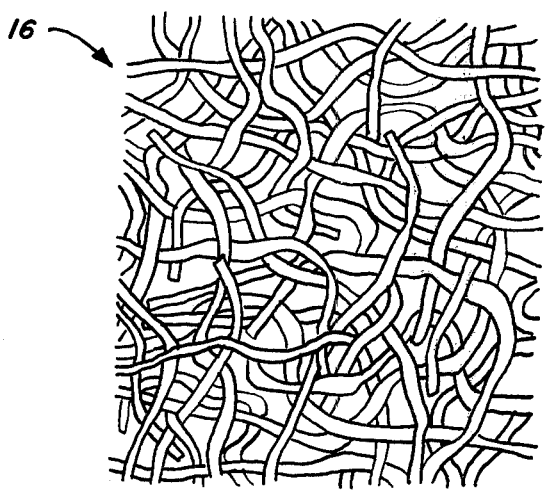
FIG. 2 is a diagrammatic representation of a portion of the liquid absorbent fibrous layer that is one component of product of this invention.

Liquid absorbent fibrous layer 16 is shown diagrammatically in the enlarged view of FIG. 2. The fibers in layer 16 include both liquid absorbent natural wood pulp fibers and wettable synthetic wood pulp fibers, all of which have generally the same morphology and appearance. The fibers are disposed in the same manner as are the fibers of backing layer 12, except they they are loosely assembled rather than compacted, resulting in a high loft, low density structure such as an air-laid non-woven web. Layer 16 does not have an adhesive binder distributed throughout the fibers as does backing layer 12. Because they are loosely assembled, these fibers in liquid absorbent layer 16 define a multiplicity of interstices between the fibers.

Emboss Lamination Of Two Fibrous Layers

The synthetic wood pulp fibers in liquid absorbent layer 16 have a melting point lower, preferably by at least 10° to 20° C., than the other fibers in that layer and in backing layer 12. Some of these fibers, arranged in a discontinuous pattern of embossed areas 14 (alternating with unembossed areas 18 across backing layer 12, FIG. 1), are heat fused and bonded to the backing layer 12 to provide a reliable bond between layers 12 and 16. The regions in which synthetic wood pulp fibers are thus bonded to backing layer 12 are shown diagrammatically in cross section in FIG. 3.

As indicated in that Figure, the remaining synthetic wood pulp fibers that are not heat fused and bonded to backing layer 12 are heat fused and bonded to each other and to other fibers in second fibrous layer 16 in regions 20 of that layer lying between embossed areas 14. A three-dimensional network of stabilized absorbent cellulose fibers which is not subject to collapsing when wet and has good liquid holding capacity is thus provided in unembossed areas 20 of second fibrous layer 16.

Additional structural integrity is provided in fibrous layer 16 by arranging synthetic wood pulp fibers in that layer in overlapping contact engagement with other synthetic wood pulp fibers in the layer to trace a multiplicity of continuous bonded fiber paths extending from one edge of said material to the opposite edge, as for example in the generally transverse direction from left to right across FIG. 2. Additional web integrity is provided if the overlapping synthetic wood pulp fibers trace a multiplicity of continuous bonded fiber paths extending from another edge of the material to the opposite edge in a direction generally normal to the first direction, or in other words vertically in FIG. 2. Such a network of continuous bonded fiber paths can be produced in most cases by including a sufficient quantity of synthetic wood pulp fibers in layer 16, for example at least about 15 percent by weight of the fibers in the layer, so that random disposition of the synthetic wood pulp fibers will bring them into an irregularly arranged pattern with the overlapping contact engagement described.

Figure 4:
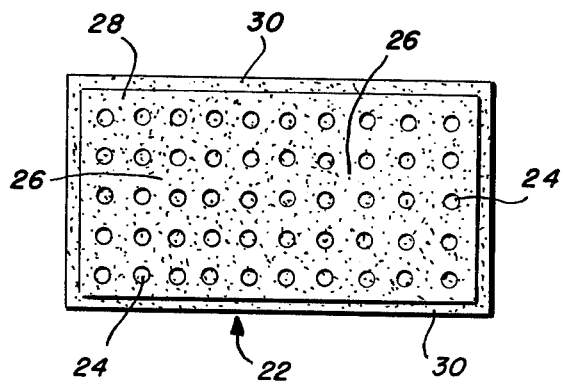
FIG. 4 is a top plan view of another embodiment of the cleaning device of this invention.

FIG. 4 shows a top plan view of a preferred embodiment of the cleaning device of this invention. In this embodiment, the discontinuous emboss laminating pattern across cleaning device 22 includes a plurality of circular embossed areas 24 alternating with unembossed areas 26 across backing layer 28. Synthetic wood pulp fibers located in the edge portions of the liquid absorbent layer underlying edge portions 30 of backing layer 28 are compacted and heat fused and bonded to other synthetic wood pulp fibers and to other types of fibers in the two layers. This prevents fiber loss and retains the product integrity of the device in use.

Figure 5:
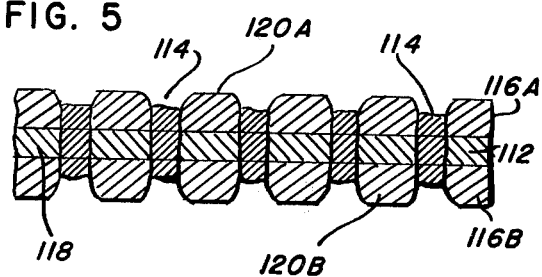
FIG. 5 is an enlarged cross sectional view of another embodiment of the invention in which a total of three layers are utilized.

FIG. 5 shows a three-ply cleaning device with two liquid absorbent layers reinforced by a single backing layer.

Backing layer is similar to backing layer 12 described above and contains uncompressed areas 118 similar to areas 14 in backing layer 12. Absorbent layers 116A and 116B are similar to absorbent layer 16 described above with unembossed area 120A in layer 116A and unembossed areas 120B in layer 116B similar to unembossed areas 20 in layer 16 described above. Embossed areas 114 provide the bonding of the layers to each other.

Method Of This Invention

In the method of this invention a backing layer of compactly assembled, adhesive bonded, natural wood pulp fibers, such as a wet-laid web, is brought together with a liquid absorbent layer of loosely assembled fibers having a multiplicity of interstices between them, such as an air-laid web, comprised of liquid absorbent natural wood pulp fibers and wettable synthetic wood pulp fibers of a lower melting point than the other fibers of the two layers as indicated above.

In the second step of the method, conventional emboss laminating equipment is employed to apply heat and pressure to the two layers in a discontinuous embossing pattern across the layers. The combination of pressure and temperature applied to the synthetic wood pulp fibers softens them, and may in fact, melt them. The synthetic wood pulp fibers of the liquid absorbent layer are thus heat fused and reliably bonded to the fibers of the backing layer of the device.

In the final step of the method, heat is applied in the absence of pressure to the rest of the liquid absorbent layer in the unembossed areas remaining after the embossing pattern has been imposed on the material. In this step, synthetic wood pulp fibers contained in the liquid absorbent layer are heat fused and bonded to each other and to other fibers in that layer. A three-dimensional network of stabilized absorbent cellulose fibers having good liquid holding capacity is thus provided in the portions of the liquid absorbent layer lying in the unembossed areas of the discontinuous pattern.

The above detailed description of this invention has been given for clarity of understanding only. No unnecessary limitations should be understood therefrom, as modifications will be obvious to those skilled in the art.

What is claimed is:

1. A multi-ply fibrous material suitable for use as a wipe, swab, sponge or other cleaning device which comprises a first backing layer formed of irregularly arranged, intersecting, overlapping, mechanically interengaged, compactly assembled natural wood pulp fibers bonded to each other with adhesive binder to provide wet strength, and at least one liquid absorbent layer formed of irregularly arranged, intersecting, overlapping, mechanically interengaged, loosely assembled fibers having a multiplicity of interstices between them, the fibers of said second-named 87 layer including both liquid absorbent natural wood pulp fibers and wettable thermoplastic synthetic wood pulp fibers, said thermoplastic synthetic wood pulp fibers in said second-named fibrous layer having a melting point lower than the other fibers of said multi-ply fibrous material, segments of a portion of the thermoplastic synthetic wood pulp fibers of said second-named layer being heat fused and bonded to said backing layer in a discontinuous pattern of embossed areas alternating with unembossed areas across said backing layer to provide a reliable bond between said layers, and the remainder of said thermoplastic synthetic wood pulp fibers being heat fused and bonded to each other and to other fibers in said second-named fibrous layer to provide a three dimensional network of stabilized absorbent cellulose fibers having good liquid holding capacity in the portions of said second-named fibrous layer lying in the unembossed areas of said discontinuous pattern.

2. The fibrous material of claim 1 wherein said material consists of a single backing layer and a single liquid absorbent layer.

3. The fibrous material of claim 1 wherein said material consists of a single backing layer sandwiched between two liquid absorbent layers.

4. The fibrous material of claim 1 in which thermoplastic synthetic wood pulp fibers in said second-named liquid absorbent layer are arranged in overlapping contact engagement with other thermoplastic synthetic wood pulp fibers in said layer to trace a multiplicity of continuous bonded fiber paths extending from one edge of said material to the opposite edge in a generally transverse direction across said material, as well as a multiplicity of continuous fiber paths extending from another edge of said material to the edge opposite thereto in a direction generally normal to said first direction.

5. The fibrous material of claim 1 cut to the shape and size of a cleaning device in which thermoplastic synthetic wood pulp fibers located in the edge portions of said second layer are compacted and heat fused and bonded to other thermoplastic synthetic wood pulp fibers and to other types of fibers in said two layers to prevent fiber loss and retain the product integrity of the device.

6. A method of producing a multi-ply fibrous material suitable for use as a wipe, swab, sponge or other cleaning device which comprises:

bringing together a first backing layer of irregularly arranged, intersecting, overlapping, mechanically interengaged, compactly assembled natural wood pulp fibers bonded to each other with adhesive binder to provide wet strength, with at least one liquid absorbent layer formed of irregularly arranged, intersecting, overlapping, mechanically interengaged, loosely assembled fibers having a multiplicity of interstices between them, said fibers including both liquid absorbent natural wood pulp fibers and wettable thermoplastic synthetic wood pulp fibers, said thermoplastic synthetic wood pulp fibers in said second-named fibrous layer having a melting point lower than the other fibers of that layer and of said first layer;

applying heat and pressure to said layers in a discontinuous embossing pattern across said layers to heat fuse and reliably bond thermoplastic synthetic wood pulp fibers of said second-named layer to said backing layer; and applying heat in the absence of pressure to the remainder of said juxtaposed layers to heat fuse and bond thermoplastic synthetic wood pulp fibers contained in said second-named fibrous layer to each other and to other fibers in said second-named layer to provide a three-dimensional network of stabilized absorbent cellulose fibers having good liquid holding capacity in the portions of said second-named fibrous layer lying in the unembossed areas of said discontinuous pattern.

7. The method of claim 6 wherein said backing layer is brought together with a single liquid absorbent layer and wherein a two-ply fibrous material is produced.

8. The method of claim 6 wherein said backing layer is brought together with two liquid absorbent layers, one on each major surface of said backing layer, and wherein a three-ply fibrous material is produced.

9. The method of claim 6 in which fibers of thermoplastic synthetic wood pulp in said second-named layer that is brought together with said first layer in the first step of said method are arranged in overlapping contact engagement with other thermoplastic synthetic wood pulp fibers in said second-named layer to trace a multiplicity of continuous bonded fiber paths extending from one edge of said second-named layer to the opposite edge in a generally transverse direction across said material, as well as a multiplicity of continuous fiber paths extending from another edge of said layer to the edge opposite thereto in a direction generally normal to said first direction.

10. The method of claim 6 which includes the steps of cutting a quantity of the multi-ply fibrous material produced according to the method there defined to the shape and size of a cleaning device and thereafter applying heat and pressure to the edge portions of said device so that synthetic wood pulp fibers located in the edge portions of said second-named layer are compacted and heat fused and bonded to other synthetic wood pulp fibers and to other types of fibers in said two layers to prevent fiber loss and retain the product integrity of the device.

* * * * *

UNITED STATES PATENT AND TRADEMARK OFFICE
CERTIFICATE OF CORRECTION

PATENT NO. : 4,154,883
DATED : July 19, 1979
INVENTOR(S) : Robert T. Elias

It is certified that error appears in the above-identified patent and that said Letters Patent are hereby corrected as shown below:

In Column 1, line 31, "697,432" should read-- 697,431 --.

"bRIEF DESCRIPTION OF THE DRAWING" should read-- BRIEF DESCRIPTION OF THE DRAWING --.

Signed and Sealed this

Twenty-seventh Day of November 1979

[SEAL]

Attest:

RUTH C. MASON
Attesting Officer

LUTRELLE F. PARKER
Acting Commissioner of Patents and Trademarks